(12) United States Patent
Matysiak et al.

(10) Patent No.: US 10,990,329 B2
(45) Date of Patent: Apr. 27, 2021

(54) WAKING AN ELECTRONIC DEVICE, SUCH AS A PRINTER, FROM A SLEEP MODE BASED ON A USER POLICY AND PROXIMITY

(71) Applicant: KYOCERA Document Solutions Inc., Osaka (JP)

(72) Inventors: Jacek Joseph Matysiak, Concord, CA (US); Dilinur Wushour, Clayton, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/798,342

(22) Filed: Feb. 22, 2020

(65) Prior Publication Data

US 2020/0201582 A1 Jun. 25, 2020

Related U.S. Application Data

(63) Continuation of application No. 16/227,432, filed on Dec. 20, 2018, now Pat. No. 10,613,801.

(51) Int. Cl.
*G06F 3/12* (2006.01)
*H04N 1/00* (2006.01)

(52) U.S. Cl.
CPC .......... *G06F 3/1204* (2013.01); *G06F 3/1294* (2013.01); *H04N 1/00244* (2013.01); *H04N 1/00342* (2013.01); *H04N 1/00896* (2013.01); *H04N 2201/0094* (2013.01)

(58) Field of Classification Search
CPC .................................................. G06F 3/1204
USPC ....................................................... 358/1.13
See application file for complete search history.

(56) References Cited

U.S. PATENT DOCUMENTS

| 7,245,389 | B2 ‡ | 7/2007 | Dougherty | G03G 15/205 |
| | | | | 347/15 |
| 7,352,980 | B2 ‡ | 4/2008 | Kato | G03G 15/5004 |
| | | | | 399/79 |
| 7,794,040 | B2 ‡ | 9/2010 | Snyder | B41J 29/393 |
| | | | | 347/19 |
| 8,819,464 | B2 ‡ | 8/2014 | Arai | G03G 15/5004 |
| | | | | 713/32 |
| 8,982,374 | B2 ‡ | 3/2015 | Oguma | G06F 21/305 |
| | | | | 358/1 |

OTHER PUBLICATIONS https://www.datasciencecentral.com/profiles/blogs/adaptive-machine-learning.‡
https://arxiv.org/pdf/1605.03027.pdf.‡
http://iopscience.iop.org/article/10.1088/1757-899X/263/4/042074/pdf.‡
http://www.junglelightspeed.com/the-fourth-generation-of-machine-learning-adaptive-learning/.‡

‡ imported from a related application

*Primary Examiner* — Jacky X Zheng
(74) *Attorney, Agent, or Firm* — W. Eric Webostad (57) ABSTRACT

Apparatus and method relating generally to controlling operation of one or more managed devices, such as printers, are disclosed. In such method, a radio frequency identification tag of a plurality of radio frequency identification tags within a first range is detected by a radio frequency identification reader of a printer. Tag information for the radio frequency identification tag is sent to a server. The tag information for a user is mapped to a user list on the server. A check for a policy for the user is made. The printer is waked from a sleep mode for operation by the user responsive to a determination the user is likely to use the printer responsive to the policy.

20 Claims, 7 Drawing Sheets

| User | RFID ID | Allowed Printers | Expected time to use | User App Data | | Accounting Policy | |
|---|---|---|---|---|---|---|---|
| A | 0001 | P1, P2, P5 | P1: Mon. & Tues. 9-5<br><br>P2: Mon-Thu, 10-12<br><br>P5: last business day of the month | OOO: 3/10-20<br><br>Holidays: 2/19, 5/28 | | Color: 100/month<br><br>Remaining: 45 | |
| B | 0002 | P1, P3, P6 | | | | | |
| C | 0003 | P2, P4 | | | | | |
| | | | | | | | |
| ... | | | | | | | |
| Visitor Mr. V | | | Visit: 10-2PM | | | Color: 10/day<br><br>Monochrome: 20/day | |
| | | | | | | | |

Columns: 501, 502, 503, 504, 505, 506

WAKING AN ELECTRONIC DEVICE, SUCH AS A PRINTER, FROM A SLEEP MODE BASED ON A USER POLICY AND PROXIMITY

CROSS-REFERENCE TO RELATED APPLICATIONS

The present application is a continuation of U.S. patent application Ser. No. 16/227,432, filed Dec. 20, 2018 (now U.S. Pat. No. 10,613,801), the disclosure of which is incorporated herein by reference in its entirety for all purposes consistent herewith.

TECHNICAL FIELD

The following description relates to waking an electronic device, such as a printer, from a sleep mode. More particularly, the following description relates to waking a printer from a sleep mode based on a user policy and proximity.

BACKGROUND

Electronic devices may go into a sleep mode or other power saving mode. It can take some time for an electronic device to wake up out of a sleep mode to be in an operational mode. For example, in an office environment, one or more printers, which may be effectively stationary for purposes of use within such an office environment, may go into a sleep mode, and then a user may have to wait for a printer to go from a sleep mode to an operational mode. It would be useful and desirable if a user did not have to wait for an electronic device to go from a sleep mode to an operational mode or at least to reduce the duration of such wait time.

SUMMARY

Generally, method and system for transitioning an electronic device, such as a printer, from a sleep mode to an operational mode is described. More particularly, the following description relates to method and system for waking a printer from a sleep mode based on a user policy and proximity.

A method relates generally to controlling operation of one or more managed printers. In such a method, a radio frequency identification tag of a plurality of radio frequency identification tags within a first range is detected by a radio frequency identification reader of a printer. Tag information for the radio frequency identification tag is sent to a server. The tag information for a user is mapped to a user list on the server. A check for a policy for the user is made. The printer is waked from a sleep mode for operation by the user responsive to a determination the user is likely to use the printer responsive to the policy.

A system relates generally to waking a printer. In such a system, a server has a memory and a processor. The memory is configured to store program code. The processor, in response to executing the program code, is configured to initiate operations to implement a change in a policy associated with a user responsive to detection of a radio frequency identification tag associated with the user. A printer with a radio frequency identification reader is in communication with the server. The radio frequency identification reader is configured to read a plurality of radio frequency identification tags within a range. The radio frequency identification reader is configured to detect a radio frequency identification tag of the radio frequency identification tags associated with the user. The printer is configured to send tag information for the radio frequency identification tag to the server. The server is configured to execute the operations in order to: map the tag information to the user in a user list on the server; check the policy for the user; and put the printer in an operational mode from a sleep mode for operation by the user responsive to a determination the user is likely to use the printer responsive to the policy.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

DETAILED DESCRIPTION

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, the order of these operations may differ from what is depicted. Also two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

Before describing the examples illustratively depicted in the several figures, a general introduction is provided to further understanding.

Types of RFID tags include active, semi-passive and passive RFID tags. Generally, active and semi-passive tags can broadcast at high frequencies from 850 to 950 MHz that can be read 100 feet (30.5 meters) or more away. RFID systems with active RFID tags can use Time Division Multiple Access (TDMA) or other forms of cellular communication. Generally, passive RFID tags rely entirely on an RFID reader as their power source and may be read up to 20 feet (6 meters) away. Near Field Communication (NFC) devices can read passive RFID tags and extract the information stored in them. Bluetooth devices can be used instead of or in addition to RFID tags. However, for purposes of clarity by way of example and not limitation, the following description is for RFID technologies. Along those lines, RFID tags may be used independently of another device, such as a smartphone or the like, in contrast to Bluetooth, NFC, and iBeacon devices.

RFID technologies may be used for tracking and recording activities of users. Fixed readers may be set up to create specific interrogation/data collection zones. This allows a defined reading area for when tags go in and out of an interrogation zone. In the following description, RFID tags are described, which may include any or all of active, semi-passive and passive RFID tags. Moreover, because communication is only one direction, a semi-passive RFID tag with an extended range, such as up to 100 meters for example, may be used. Generally, semi-passive RFID tags use batteries and rely on an RFID reader signal to communicate. Semi-passive RFID tags operate at the 860 MHZ-960 MHz UHF range.

A printing device may be awoken from a sleep mode or other power saving mode based on proximity of an RFID tag to such device, namely an RFID tag within an interrogation zone, and a user policy. In another example, Bluetooth may be used instead of RFID for a smaller interrogation zone. Such a device may have an RFID reader to detect RFID tags within a proximity to such reader and then to wake such device from a sleep mode.

Apparatus(es) and method(s) relating generally to controlling operation of one or more managed printing devices are disclosed. For example in one such method, a radio frequency identification tag of a plurality of radio frequency identification tags within a first range is detected by a radio frequency identification reader of a device. Tag information for the radio frequency identification tag is sent to a server. The tag information for a user is mapped to a user list on the server. A check for a policy for the user is made. The printing device is waked from a sleep mode for operation by the user responsive to a determination the user is likely to use the device responsive to the policy. With the above general understanding borne in mind, various configurations for systems and method for awaking a device from a sleep mode are generally described below. Along those lines, for example a method relates generally to controlling operation of one or more managed printing devices. In one such method, a radio frequency identification tag of a plurality of radio frequency identification tags within a first range is detected by a radio frequency identification reader of a printing device. Tag information for the radio frequency identification tag is sent to a server. The tag information for a user is mapped to a user list on the server. A check for a policy for the user is made. The device is waked from a sleep mode for operation by the user responsive to a determination the user is likely to use the device responsive to the policy.

Additionally along the above lines, for example a system relates generally to waking a printing device. In one such system, a server has a memory and a processor. The memory is configured to store program code. The processor, in response to executing the program code, is configured to initiate operations to implement a change in a policy associated with a user responsive to detection of a radio frequency identification tag associated with the user. A printing device with a radio frequency identification reader is in communication with the server. The radio frequency identification reader is configured to read a plurality of radio frequency identification tags within a range. The radio frequency identification reader is configured to detect a radio frequency identification tag of the radio frequency identification tags associated with the user. The printing device is configured to send tag information for the radio frequency identification tag to the server. The server is configured to execute the operations in order to: map the tag information to the user in a user list on the server; check the policy for the user; and put the device in an operational mode from a sleep mode for operation by the user responsive to a determination the user is likely to use the device responsive to the policy.

Figure 1:
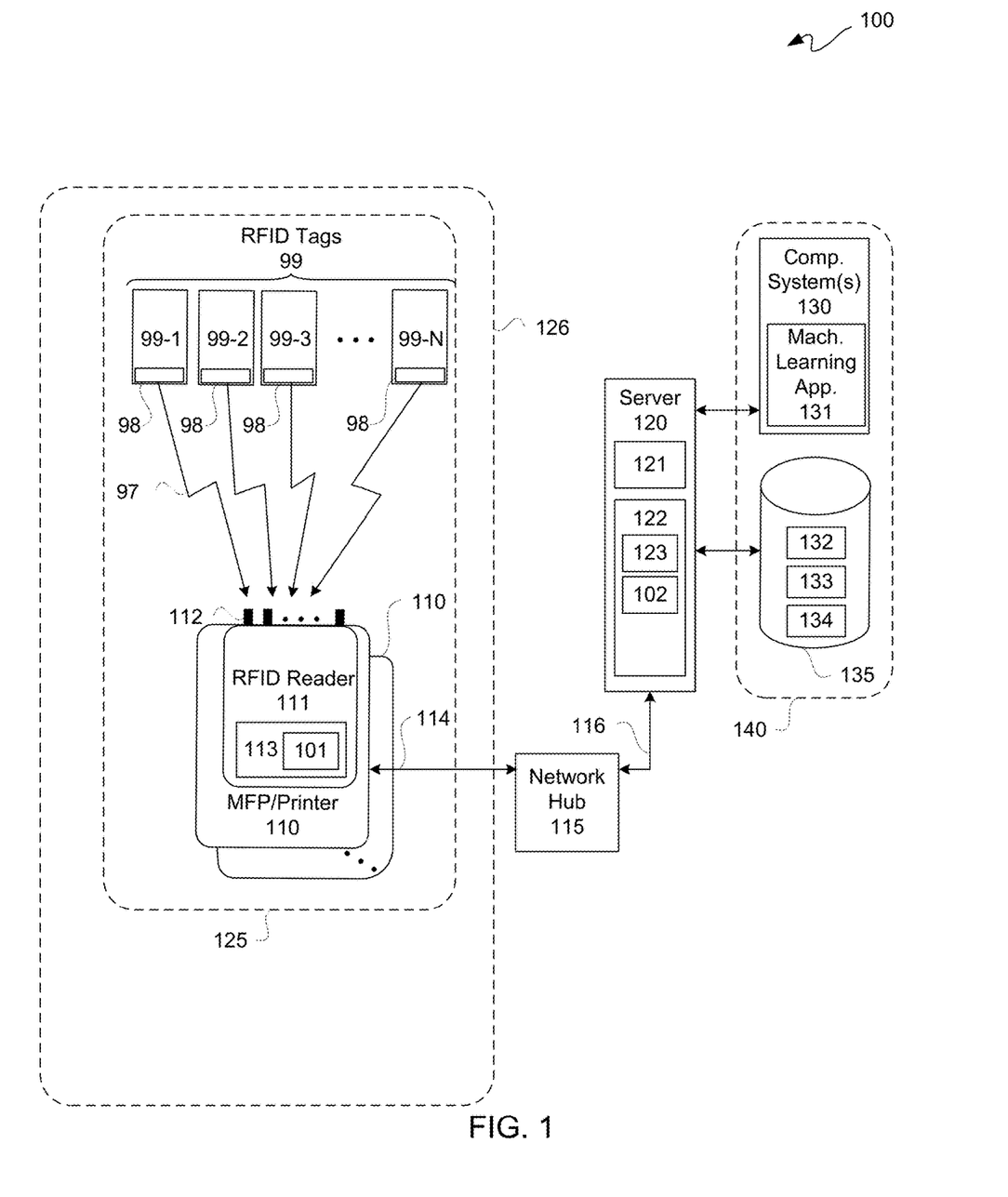
FIG. 1 is a block diagram depicting an exemplary RFID system.

FIG. 1 is a block diagram depicting an exemplary RFID system 100. A server computing system ("server") 120 includes a processor 121 and a memory 122. Memory 122 may be used to store program code 123. Processor 121, in response to executing program code 123, may be configured to initiate operations to implement a change in a policy associated with a user responsive to detection of an RFID tag 99-N associated with such a user. In this example, RFID tags 99-1 through 99-N for N a positive integer are illustratively depicted as being at least four; however, fewer or more than four RFID tags 99 may be used. RFID tags 99 are a low-cost option, and such RFID tags 99 are readily locatable in a smart card, such as an employee badge or the like.

Antennas 98 of RFID tags 99 may wirelessly or over-the-air communicate 97 with one or more antennas 112 of an electronic device 110 with an RFID reader 111. In this example, electronic device 110 is a multi-function printer (MFP) or a printer ("printer") 110. Printer 110 may be in wireless or wired communication 114 with a network hub or other network appliance 115 for being in communication with server 120. Network hub 115 may be in wireless or wired communication 116 with server 120. Additionally, there may be more than one printer 110 in a network with an RFID reader 111.

RFID reader 111 may be configured to detect and read any one or more of a plurality of RFID tags 99 within an interrogation zone 125 as associated with one or more users. Interrogation zone 125 may be defined by a range for reading RFID tags 99. In an example, RFID reader 111 may be a fixed reader set up to create a specific interrogation area 125. A fixed RFID reader 111 may be used to provide a defined reading area 126 for when users take RFID tags 99 in and out of such an interrogation zone 125. In other words, an interrogation zone 125 may be coterminous with a reading area 126 in one example; however, in another example, an interrogation zone 125 may be a subset of a reading area 126 of an RFID reader 111. Data obtained within an interrogation zone 125 may be treated differently than data obtained within a reading area 126 not in such interrogation zone 125 by a probability model.

RFID reader 111 may include memory 113 for storing tag information 101 read from an RFID tag 99 associated with a user. Printer 110 may be configured to send tag information 101 obtained from an RFID tag 99 to server 120 via network hub 115. Server 120 may be configured to execute operations in order to: map tag information 101 to a corresponding user in a user list 102 stored in memory 122 on server 120.

Read RFID tag 99 provides tag information 101 for a user. Program code 123 may configure server 120 to check a policy for such a user. A user on user list 102 may be used as an index to access database 135 in communication with server 120 for a policy from a policy store 132 of such database. Database 135 may further include a store of usage information 133 associated with users on user list 102 and a store of scheduling information 134 associated with users on user list 102, as well as other information.

Responsive to a determination that such a user is likely to use printer 110 responsive to information obtained from such policy, program code 123 may be configured to wake printer 110 from a sleep or other power saving mode to put printer 110 into an operational mode for operation by a user associated with such RFID tag 99 read. This allows a printer 110 to be in an operational mode without a user having to wait for such printer to go completely from a sleep mode to an operational mode. In some instances, a printer 110 may be in an operational mode when a user arrives at such printer. In other instances, at least a wait time experienced by a user waiting for a printer 110 to switch from a sleep mode to an operational mode may be reduced significantly by starting such transition prior to user arrival at such printer as described herein.

Server 120 may be configured to send a policy for a user to an adaptive machine learning application 131 for updating and to receive such policy with an update from adaptive machine learning application 131 as such policy. Furthermore, machine learning application 131 may run on one or more computing systems 130 coupled for communication with server 120 and database 135. Such one or more computing systems 130 and database 135 may be in a cloud-based system 140. Adaptive machine learning application 131 may be a backend application of such a cloud-based system 140 having a database 135 with user information regarding each user policy.

Server 120 may be configured to determine whether a user is likely to use printer 110 responsive to an obtained policy for such user. Server 120 may be configured to initiate an operational mode of printer 110 from a sleep mode for operation by such a user responsive to a determination such user is likely to use printer 110 in near term based on such policy. Server 120 may be configured to obtain from printer 110 usage information associated with use of printer 110 in an operational mode by such user and send such usage information and an associated policy to adaptive machine learning application 131.

Figure 2:
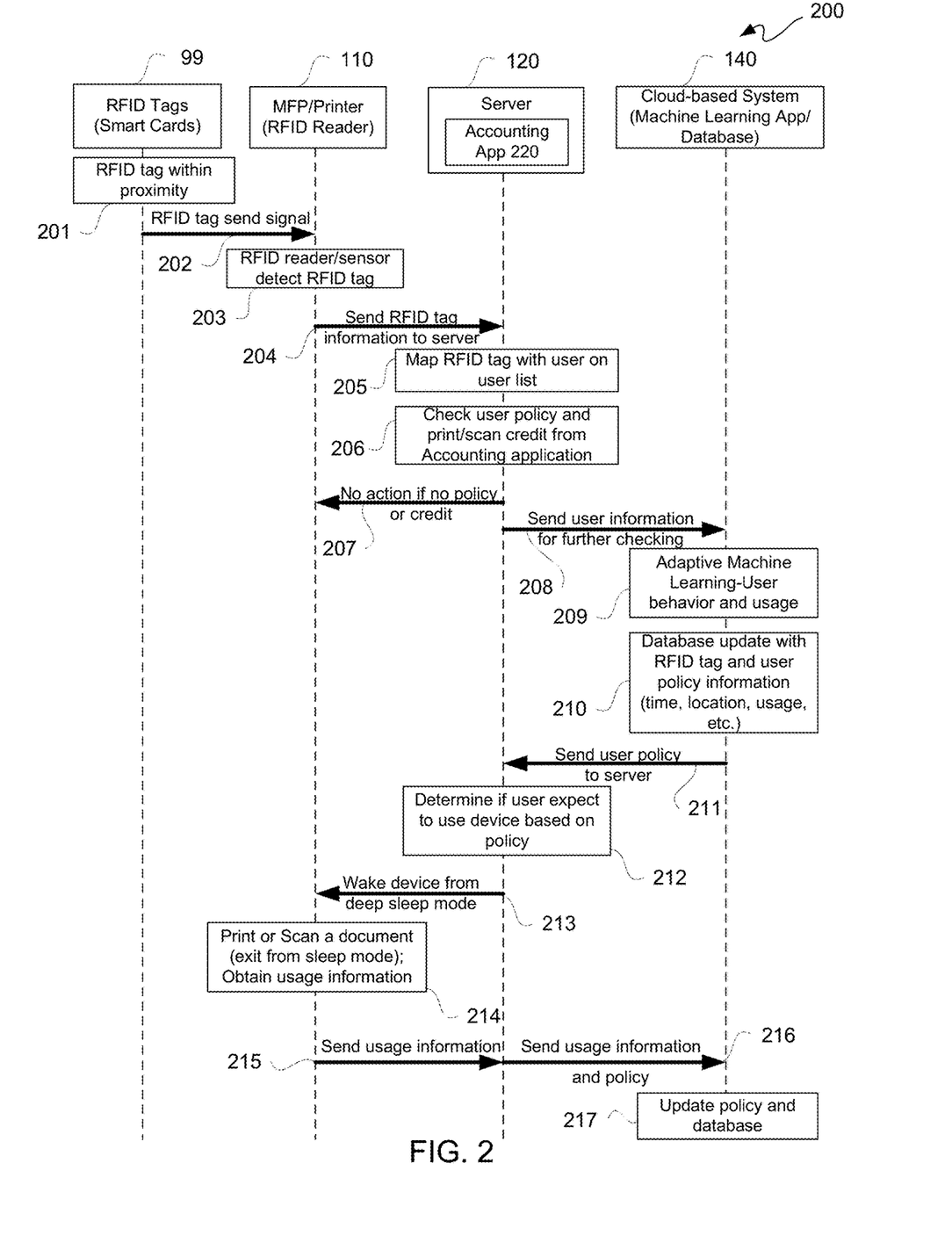
FIG. 2 is a scheduling-flow diagram depicting an example of a managed device operations flow.

FIG. 2 is a scheduling-flow diagram depicting an example of a managed printing device operations flow 200. Managed device operations flow 200 is to control operation of one or more managed devices, as further described with simultaneous reference to FIGS. 1 and 2.

At 201, there is at least one RFID tag 99-*n* of a plurality of RFID tags 99-1 through 99-N, for n in a range of 1 to N inclusive, within a first range, such as a first interrogation zone 125. At 202, such at least one RFID tag 99-*n* sends a signal. In this example, such RFID tags 99 are semi-active or active instances implemented in smart cards.

At 203, such at least one RFID tag 99-*n* is detected by an RFID sensor or reader 111 of printer 110. At 204, such reader 111 sends tag information for such at least one RFID tag 99-*n* to a server 120. In this example, program code 123 includes an accounting application 220.

At 205, such RFID tag information for a user is mapped on a user list 102 on server 120. At 206, a check for a user policy is made by program code 123 executed on server 120. Optionally, at 206, a check may be made to determine presence of a credit for the user to use printer 110. Examples of credit may include one or more of financial credit, tokens, pre-paid credit, allocated account credit, and/or the like. For example, at least one of a print or scan credit for such a user may be found by querying accounting application 220 to determine if a user has sufficient credit for an operation or portion thereof. If at 206 it is determined that a user has no policy for using printer 110 or no credit for using printer 110, then at 207 no action to wake a printer 110 is taken.

If, however, at 206 it is determined that a user has a policy for using printer 110 and has credit for using printer 110, then at 208 user information may be sent to cloud-based system 140 for further checking. Along those lines, such user policy may be sent from server 120 to an adaptive machine learning application 131. At 209, adaptive machine learning application 131 may update such a user policy responsive to user behavior and usage of printer 110. A list of RFID tags can be configured at any time, and different policies for users associated with such RFID tags can be applied per user.

At 210, a database 135 of cloud-based system 140 may receive user information and be updated for a user. Database 135 may be updated with RFID tag and user policy information, such as day, time, location, usage, and/or other parameter(s), with user information regarding such policy to store an update for such user. For example, information regarding day, time, and location of a user may be added to such user policy.

At 211, such policy with an update may be sent from adaptive machine learning application 131 to the server 120 as a user policy. Such updated policy for a user may replace a previous policy for such user stored in memory of server 120.

At 212, program code 123 on server 120 may determine whether a user is likely to use printer 110 based on a current policy for such user. At 213, if program code 123 determines that a user is likely to use printer 110, then server 120 initiates waking of printer 110 from a sleep mode for operation by a user responsive to such likelihood.

At 214, a user uses printer 110 after an exit from a sleep mode. For example, a user may print or scan a document. At 214, usage information associated with use of printer 110 after waking thereof may be obtained by printer 110. Usage information may include day, time, location, and operation of printer 110 by such a user.

Optionally, at 215, such usage information obtained at 215 may be sent from printer 110 to server 120. Server 120 at operation 216 may send a policy for such user as well as such usage information to adaptive machine learning application 131 and database 135. At 217, adaptive machine learning application 131 may update a policy for such user for such usage information, and database 135 may be updated with such updated policy and with usage information in association with such policy for a user.

Program code 123 may be configured to wake printer 110 from a sleep mode and optionally may consider waking printer 110 only for select RFID tags, as a filtered user list may be used, such as for example only specific users added on a list would be allowed to wake a particular printer. Further, program code 123 may account for what day and time of day it is and only wake printer 110 when a detected RFID tag user is expected to use printer 110, such as through observation using the adaptive machine learning application 131. For example, if a user does not typically use printer 110 before 10 am, such printer 110 detecting that an RFID tag at 9 am might not be woken from a sleep mode by server 120.

Figure 3:
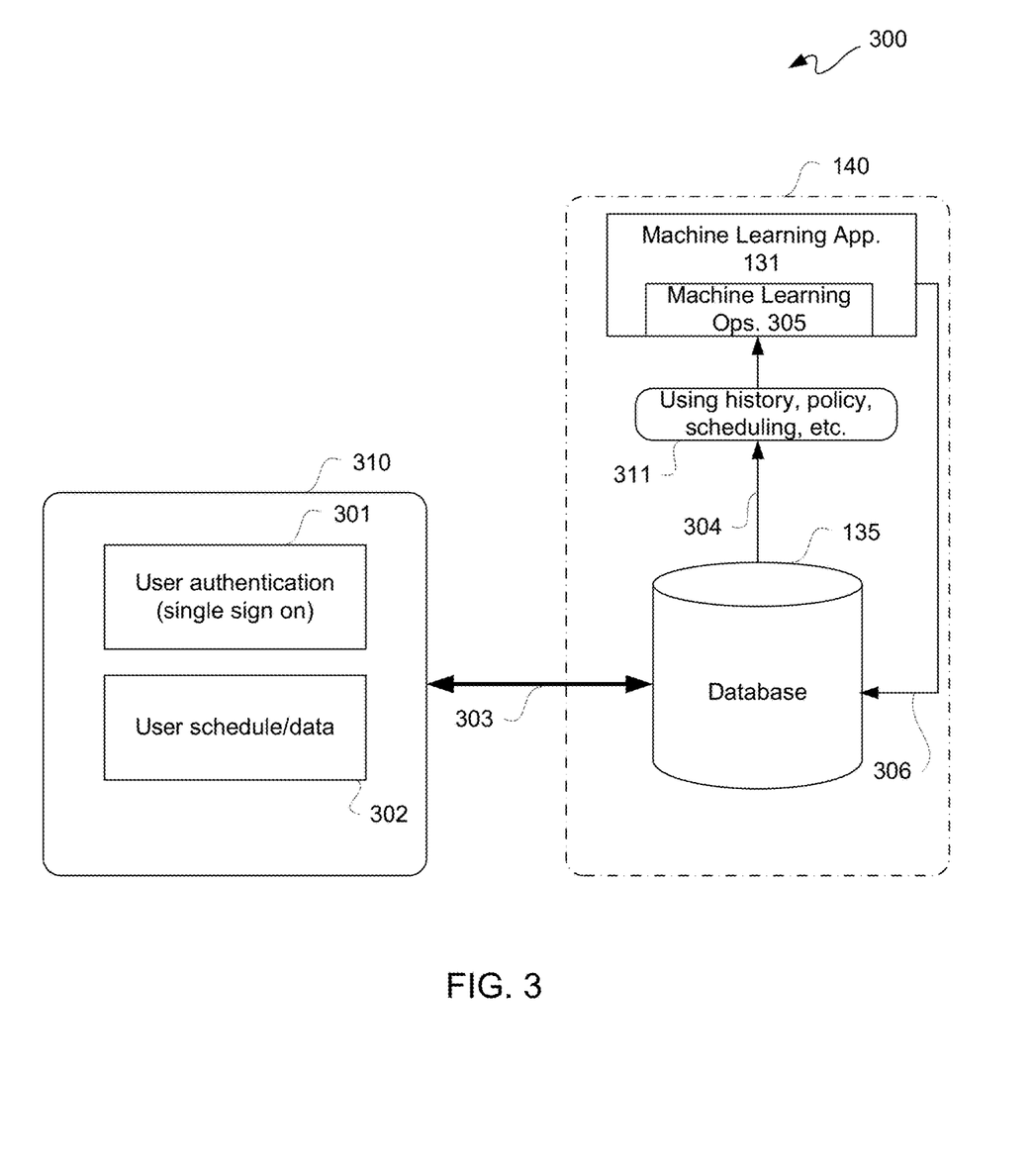
FIG. 3 is a block-flow diagram depicting an example of a policy building flow.

FIG. 3 is a block-flow diagram depicting an example of a policy building flow 300. Policy building flow 300 of FIG. 3 is described with simultaneous reference to FIGS. 1 through 3.

At 301, a user might sign on or otherwise be authenticated on a desktop, notebook, tablet, smartphone, or other electronic device 310. At 302, a user schedule/data application may be accessed, such as for example Outlook from Microsoft Corp.

At 303, schedule and other user data may be sent to and stored in database 135 with user identification responsive to authentication at 301. At 304, database 135 may communicate scheduling and other user data 311, along with printer 110 usage history, and a user policy for such user to a machine learning application 131. At 305, machine learning application 131 may perform machine learning operations on such information sent at 304 in order to update a policy for such user, and such updated user policy may be provided to database 135 for updating and storage therein at operation 306.

The act of predicting if a "contact" or "signal" associated with a person is likely to move to a location associated with a printer 110 may be similar to predicting the probable destinations for a vehicle. There are many known examples of predictive analytics for vehicles. To implement these vehicular predictive analytics, some have used various forms of feedforward neural networks for machine learning. For example, some have used a multi-layer perceptrons neural network on vectors composed of coordinates of beginnings of trajectories and diverse context information. For example, a feedforward neural network may be configured to model data and then be trained responsive to such modeled data.

For example, a user's location may be generally known with RFID. Furthermore, user behavior may be used with predictive analytics to determine a destination location of such RFID identified user, namely whether such user is likely to go to a printer 110 of a set of printers 110 or other possible locations within such RFID range. In this instance, signal strength RSSI (received signal strength indication) received from the user and change in RSSI over time may be tracked with RFID. These and other considerations may be used in determining a maximum likelihood ("ML") of a user's action. Along those lines, multiple printers 110 each with at least one RFID reader 111 may be used to enhance detecting location of an RFID tag, such as for example using triangulation and/or multilateration (MLAT). However, whether one or multiple RFID readers 111 are used, location of RFID tags may be at least generally determined using RSSI and/or time difference of arrival (TDOA) between RFID tags for real-time location applications, which may further be used with triangulation and/or multilateration.

Figure 4:
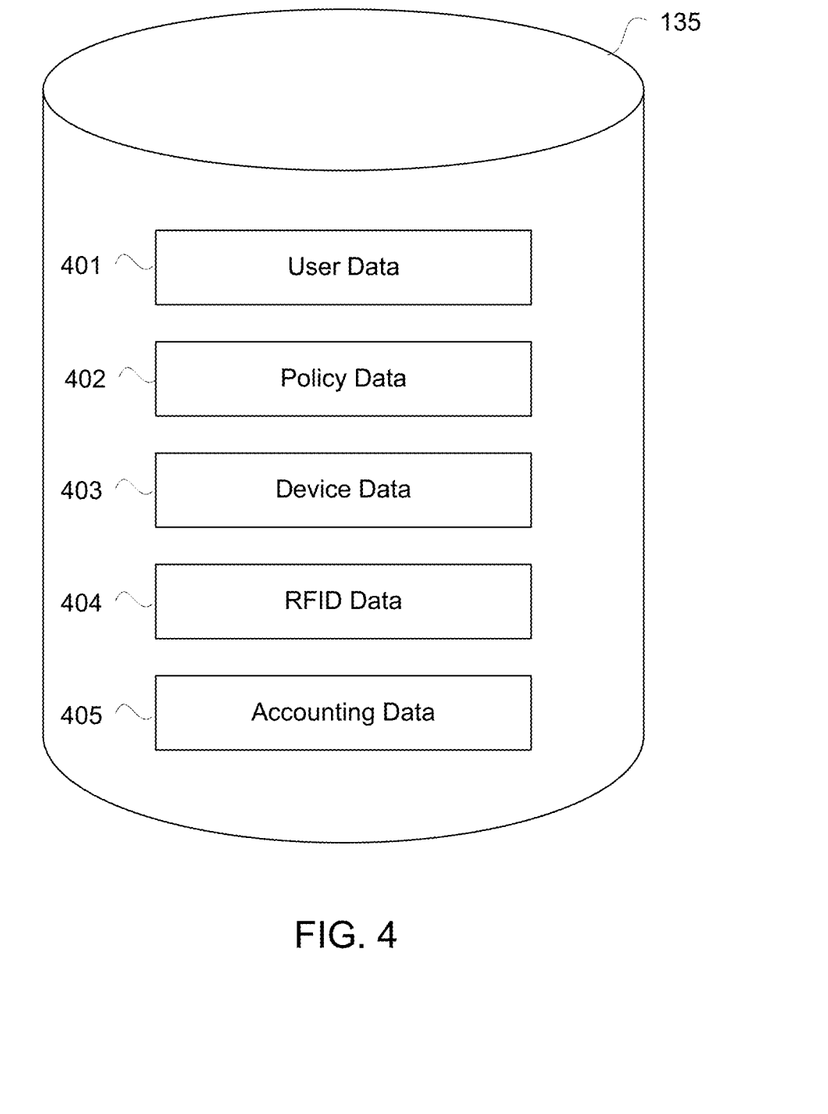
FIG. 4 is a block diagram depicting an example of a database.

FIG. 4 is a block diagram depicting an example of a database 135. Database 135 may have different stores of information, for example stores 401 through 405. These stores of information may be related to one another for example in a relational database 135. In this example, database 135 has a user data store 401, a policy data store 402, a device data store 403, an RFID data store 404, and an accounting data store 405. These and/or other collections or stores of information may be used in this or other examples, and such stores may be related to one another in a relational database.

Figure 5:
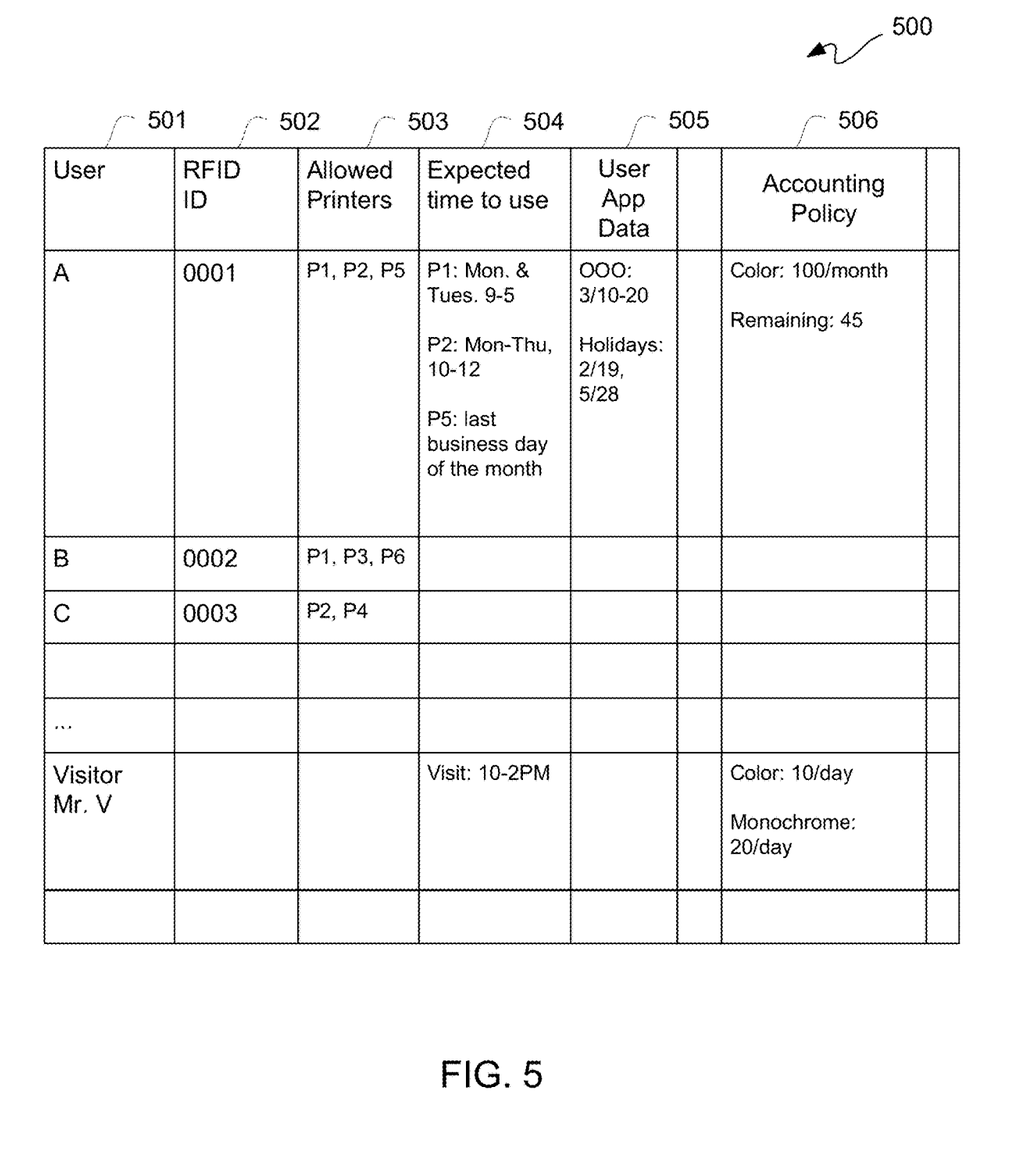
FIG. 5 is a table diagram depicting an example of a relational table for a database of FIG. 4.

FIG. 5 is a table diagram depicting an example of a relational table 500 for database 135 of FIG. 4. Relational table 500 may have a column 501 for users, a column 502 for RFID tag identifiers, a column 503 for allowed printers 110, a column 504 for expected use times, a column 505 for user application data, and a column 506 for accounting policy. In another example, accounting policy may be separately tracked in an accounting application 220.

User application data for column 505 may be obtained such as described with reference to FIG. 3 from a scheduling application for example. Non-limiting examples of data are provided in relational table 500 for purposes of clarity by way of example; however, these and/or other types of information may be used.

Figure 6:
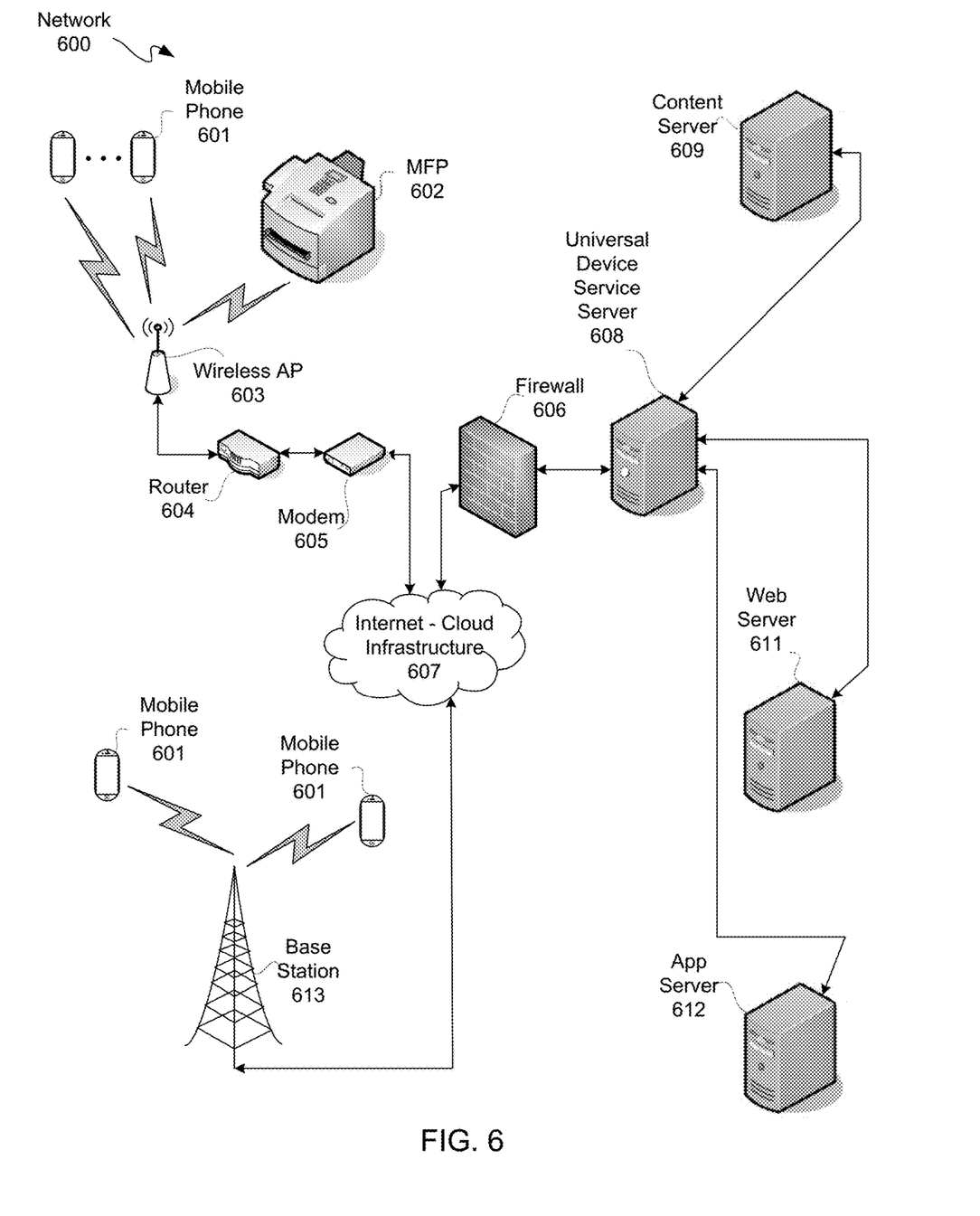
FIG. 6 is a pictorial diagram depicting an exemplary network.

Because one or more examples involve a network or networks, FIG. 6 is a pictorial diagram depicting an exemplary network 600. Network 600 may include one or more mobile phones 601 in wireless communication with wireless access point ("AP") 603 and one or more mobile phones 601 in communication with a base station 613.

An MFP 602 may be in wireless communication with wireless AP 603. Wireless AP may be connected for communication with a router 604, which in turn may be connected to a modem 605. Modem 605 and base station 613 may be in communication with the Internet-Cloud infrastructure 607.

A firewall 606 may be in communication with the Internet-Cloud infrastructure 607. Firewall 606 may be in communication with a universal device service server 608. Universal device service server 608 may be in communication with a content server 609, a web server 611, and/or an app server 612. App server 612, as well as a network 600, may be used for downloading an app.

Accordingly, known details regarding networks are not described in unnecessary detail for purposes of clarity and not limitation.

Figure 7:
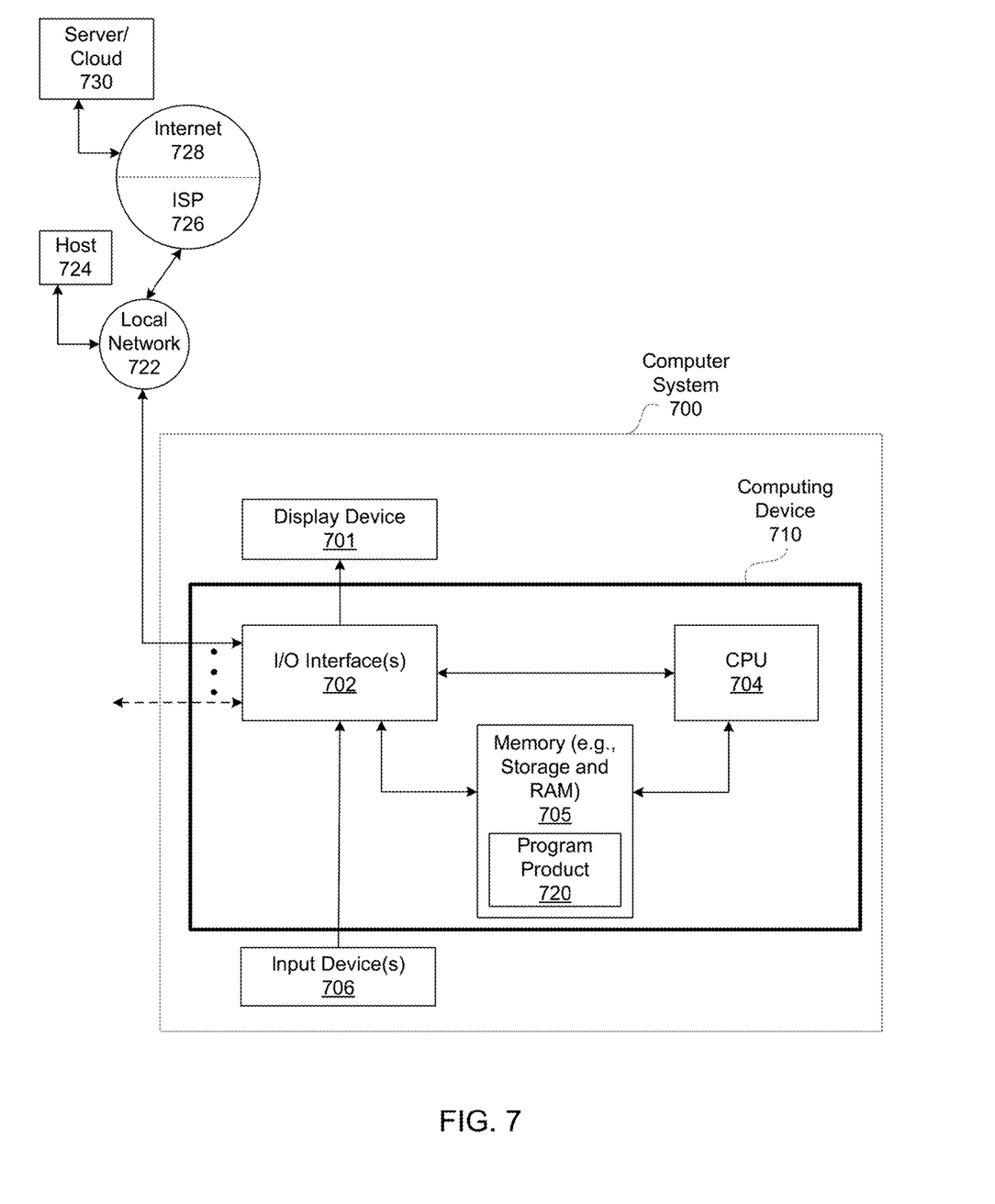
FIG. 7 is a block diagram depicting an example computer system.

FIG. 7 is a block diagram depicting an example computer system 700 upon which one or more aspects described herein may be implemented. Along those lines, an MFP, such as MFP 702, in effect may be a computer system, where a panel thereof, is effectively a display device 701.

More generally, such a computer system 700 may include a programmed computing device 710 coupled to a display device 701, such as Liquid Crystal Displays ("LCDs"), Light Emitting Diode ("LED") displays, and to one or more input devices 706, such as a keyboard and a cursor pointing device. Display 701 may be a touch screen display, as previously described. Computer system 700 by itself or networked with one or more other computer systems may provide an information handling system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, Unix, or a Windows operating system, among other platforms, including without limitation an embedded operating system, such as VxWorks. Programmed computing device 710 includes a central processing unit ("CPU") 704, one or more memories and/or storage devices ("memory") 705, and one or more input/output ("I/O") interfaces ("I/O interface") 702.

CPU 704 may be a type of microprocessor known in the art, such as available from IBM, Intel, ARM, and Advanced Micro Devices for example. CPU 704 may include one or more processing cores. Support circuits (not shown) may include busses, cache, power supplies, clock circuits, data registers, and the like.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through an SATA bus or other bus. Moreover, one or more SSDs may be used, such as for RAID or other multiple drive storage for example.

I/O interface 702 may include chip set chips, graphics processors, and/or daughter cards, among other known circuits. I/O interface 702 may be include interface circuitry adapted to receive and transmit data, such as data files and the like.

Programmed computing device 710 may optionally include one or more peripheral cards (not shown). An example of a daughter or peripheral card may include a network interface card ("NIC"), a display interface card, and a Universal Serial Bus ("USB") interface card, among other known circuits.

Programmed computing device 710 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 710. However, for purposes of clarity and not limitation, it shall be assumed that an SSD is housed in programmed computing device 710.

Memory 705 may store all or portions of one or more programs or data, including variables or intermediate information during execution of instructions by CPU 704, to implement processes in accordance with one or more examples hereof to provide program product 720. Program product 720 may be for implementing all or portions of process flows, as described herein. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of the sequences of instructions contained in main memory may cause CPU 704 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 720. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load the instructions into its dynamic memory and send such instructions over a transmission media using a modem. A modem local to computer system 700 can receive such instructions on such transmission media and use an infra-red transmitter to convert such instructions to an infra-red signal. An infra-red detector can receive such instructions carried in such infra-red signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

Computer system 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726 or other Internet service provider. ISP 726 may in turn provide data communication services through a world-wide packet data communication network, the "Internet" 728. Local network 722 and the Internet 728 may both use electrical, electromagnetic or optical signals that carry analog and/or digital data streams. Data carrying signals through various networks, which carry data to and from computer system 700, are example forms of carrier waves for transporting information.

Wireless circuitry of I/O interface 702 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000, EV-DO, and LTE/LTE-Advanced) can be used depending on the type of communication or the range of the communication.

Computer system 700 can send messages and receive data, including program code, through network(s) via a network link and communication interface of I/O interface 702. In the Internet example, a server 730 might transmit a requested code for an application program through Internet 728, ISP 726, local network 722 and I/O interface 702. Received code may be executed by processor 704 as it is received, and/or stored in a storage device, or other non-volatile storage, of memory 705 for later execution. In this manner, computer system 700 may obtain application code in the form of a carrier wave.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method, comprising:
   detecting an identification tag of a plurality of identification tags within a first wireless range by a reader of an electronic device;
   sending tag information for the identification tag to a server;
   mapping the tag information for a user in a user list on the server;
   checking a policy for the user;
   waking the electronic device from a sleep mode for operation by the user responsive to a determination the user is likely to use the electronic device responsive to the policy; and
   sending the policy for the user from the server to an adaptive machine learning application.

2. The method according to claim 1, further comprising:
   updating the policy by the adaptive machine learning application; and
   sending the policy with an update from the adaptive machine learning application to the server as the policy.

3. The method according to claim 2, wherein the checking of the policy comprises:
   determining by the server whether the user is likely to use the electronic device responsive to the policy; and
   initiating by the server the waking of the electronic device from the sleep mode for operation by the user responsive to a determination the user is likely to use the electronic device.

4. The method according to claim 3, wherein the checking further comprises determining presence of a credit for the user to use the electronic device.

5. The method according to claim 4, wherein the electronic device is a printer.

6. The method according to claim 5, wherein the printer is coupled to a network including other ones of managed printers.

7. The method according to claim 6, wherein the credit is for at least one of printing or scanning.

8. The method according to claim 4, wherein the checking is from an accounting application executed on the server.

9. The method according to claim 2, wherein the adaptive machine learning application is a backend application of a cloud-based system.

10. The method according to claim 9, further comprising updating a database of the cloud-based system with user information regarding the policy to store the update.

11. The method according to claim 10, wherein the updating includes adding information regarding day, time, and location of the user.

12. The method according to claim 2, further comprising:
    obtaining usage information associated with use of the electronic device after the waking thereof; and
    sending the usage information and the policy to the adaptive machine learning application.

13. The method according to claim 12, wherein:
    the adaptive machine learning application is a backend application of a cloud-based system; and
    the sending of the usage information is to the server and then on to the cloud-based system for the adaptive machine learning application.

14. The method according to claim 13, further comprising updating a database of the cloud-based system with the usage information in association with the policy for the user.

15. The method according to claim 14, wherein the usage information includes day, time, location, and operation of the electronic device by the user.

16. A system, comprising:
    a server having a memory and a processor;
    the memory configured to store program code;
    the processor, in response to executing the program code, configured to initiate operations to implement a change in a policy associated with a user responsive to detection of an identification tag associated with the user;
    an electronic device with a reader in communication with the server;
    wherein:
        the reader is configured to read a plurality of identification tags within a wireless range;
        the reader is configured to detect an identification tag of the identification tags associated with the user;
        the electronic device is configured to send tag information for the identification tag to the server; and
        the server is configured to execute the operations in order to:
            map the tag information to the user in a user list on the server;
            check the policy for the user;
            put the electronic device in an operational mode from a sleep mode for operation by the user responsive to a determination the user is likely to use the electronic device responsive to the policy; and
            send the policy for the user to an adaptive machine learning application for updating the policy for the user.

17. The system according to claim 16, wherein the server is configured to receive the policy with an update from the adaptive machine learning application as the policy.

18. The system according to claim 17, wherein the server is configured to determine whether the user is likely to use the electronic device responsive to the policy and initiate the operational mode of the electronic device from the sleep mode for operation by the user responsive to a determination the user is likely to use the electronic device.

19. The system according to claim 18, wherein the server is configured to obtain usage information from the electronic device associated with use of the electronic device in the operational mode by the user and send the usage information and the policy to the adaptive machine learning application.

20. The system according to claim 19, wherein the adaptive machine learning application is a backend application of a cloud-based system having a database with user information regarding the policy.

* * * * *